United States Patent [19]

Ragas et al.

[11] 4,339,505

[45] Jul. 13, 1982

[54] ELECTROGRAPHIC COATINGS CONTAINING ACRYLAMIDE COPOLYMERS

[75] Inventors: Frank J. Ragas, Willow Springs; Ralph L. Minnis, Des Plaines; Gerson E. Beauchamp, Park Ridge, all of Ill.

[73] Assignee: DeSoto, Inc., Des Plaines, Ill.

[21] Appl. No.: 124,111

[22] Filed: Feb. 25, 1980

[51] Int. Cl.[3] .................................... B32B 23/08

[52] U.S. Cl. .................................... 428/514; 162/135; 162/136; 428/511; 427/121; 524/425; 524/555

[58] Field of Search ............... 428/511, 513, 514, 530; 260/33.4 PQ, 33.6 PQ, 37 NP; 162/135, 136, 138, 168 MA; 427/121

[56] References Cited

U.S. PATENT DOCUMENTS

| | | | |
|---|---|---|---|
| 3,813,264 | 5/1974 | Boothe | 427/121 |
| 3,830,655 | 8/1974 | Rothwell | 427/121 |
| 3,957,710 | 5/1976 | Rohmann et al. | 428/511 |
| 4,007,148 | 2/1977 | Ginter et al. | 428/511 |
| 4,222,901 | 9/1980 | Sinkovitz | 428/511 |

FOREIGN PATENT DOCUMENTS

| | | | |
|---|---|---|---|
| 754244 | 12/1970 | Belgium | 428/511 |
| 51-22729 | 2/1976 | Japan | 428/511 |

*Primary Examiner*—George F. Lesmes
*Assistant Examiner*—E. Rollins Buffalow
*Attorney, Agent, or Firm*—Dressler, Goldsmith, Shore, Sutker & Milnamow, Ltd.

[57] ABSTRACT

Electrically conductive paper is coated with an insulating coating to provide improved electrographic properties using a solvent-soluble copolymer comprising from 5% to 40% of copolymerized acrylamide or a monoethylenic derivative thereof. The coating is preferably pigmented with calcium carbonate, and the presence of the copolymerized acrylamide allows an increase in the pigment to binder ratio into the range of from 2:1 to 6:1.

11 Claims, No Drawings

ELECTROGRAPHIC COATINGS CONTAINING ACRYLAMIDE COPOLYMERS

DESCRIPTION

1. Technical Field

This invention relates to insulating coatings which are applied to conductive substrates to accept and hold an electrostatic charge as part of an electrostatic reprographic system.

2. Background Art

The application of insulating coatings to conductive substrates to produce coated sheets useful in electrographic printing processes is well known. In the known process, a paper which has been impregnated to render it electrically conductive is coated on one surface with an insulating resin which contains a proportion of inexpensive pigment, such as calcium carbonate, to provide an attractive surface coating which will hold an electrostatic charge. The coated paper is then passed over a charging electrode which applies an electrostatic charge to the coated surface in a pattern, and the coating is expected to receive as high a charge as possible and to hold this charge so that toner will be picked up only in the charged pattern.

The existing electrographic coatings are inadequate because: 1- they do not accept and hold as high a level of charge as is desired; 2- they tend to pick up a background charge; and 3- they cannot usefully contain as high a proportion of pigment as is desired.

DISCLOSURE OF INVENTION

In accordance with this invention, the polymer used to provide the insulating coating is a copolymer of monoethylenically unsaturated monomers containing from 5% to 40%, based on the total weight of the copolymer, of acrylamide or, less desirably, a derivative of acrylamide. The inclusion of the acrylamide component into the copolymer increases the capacity of an applied coating to accept and hold a charge, to minimize background charge, and to usefully accept the presence of a larger proportion of pigment.

The use of larger amounts of pigment, especially calcium carbonate, is important because the cost of the coating decreases and the attractive appearance and hand increases as the pigment to binder ratio increases. One can view this achievement from different standpoints. If we use polyvinyl butyral as the polymer in the insulating coating, which represents a conventional approach, then the coating may practicably contain calcium carbonate at a pigment to binder ratio as high as about 1.3:1. Using a copolymer containing 10% acrylamide, we have been able to practicably employ a ratio as high as about 4:1, and when the acrylamide content is raised to 30%, then the pigment to binder ratio can be further increased to about 6:1. We prefer to use from 7% to 30% acrylamide, and a pigment to binder ratio of from 2:1 to 6:1.

It will be understood that all proportions and ratios herein are by weight, unless otherwise specified.

The polymer used to provide the insulating coating is an organic solvent-soluble, nongelled polymer comprising copolymerized acrylamide or a monoethylenic derivative thereof. Copolymers formed by solution copolymerization are preferred, and it is particularly preferred to employ copolymers entirely constituted by copolymerized monethylenically unsaturated monomers.

The preferred monomers are styrene and $C_1$–$C_8$ alkanol esters of acrylic and methacrylic acid. Methyl methacrylate is particularly preferred to constitute at least about 30% of the copolymer. N-butyl and isobutyl acrylate and methacrylate are also useful and 2-ethylhexyl acrylate is preferred for providing internal plasticization. Vinyl toluene and vinyl acetate are also useful.

Unsaturated alkyd resins and unsaturated epoxy esters and ethers are known to be useful in the production of solvent-soluble, nongelled copolymers, and these may be included in the copolymers of this invention.

It is particularly preferred to employ from 3–20% of an hydroxy functional monoethylenic monomer, such as 2-hydroxyethyl acrylate or methacrylate. Up to about 3% of a monoethylenic acid, such as acrylic or methacrylic acid, may also be included.

The selection of pigment is conventional herein, calcium carbonate being particularly preferred as indicated previously. Pigmentation is also conventional and may be carried out by simply grinding the finely divided calcium carbonate pigment into the solvent solution of the copolymer.

Acrylamide is preferred because it is most economical, and on an equiweight basis, it is most effective. However, derivatives of acrylamide which retain the single ethylenic group and the amide structure are also useful. These derivatives are illustrated by methacrylamide, dimethyl aminopropyl methacrylamide, dimethyl acrylamide, isobutoxymethacrylamide and isopropyl aminopropyl methacrylamide.

BEST MODE FOR CARRYING OUT THE INVENTION

The invention in its preferred forms are illustrated in the following examples.

EXAMPLE 1

28 parts of 2-ethylhexyl acrylate, 50 parts of methyl methacrylate, 12 parts of 2-hydroxyethyl methacrylate and 10 parts of acrylamide are copolymerized in 60% solvent solution. Using a mixture of 45% toluene and 55% n-propanol as the solvent, the solution viscosity of the copolymer product is about $Z_7$. By pigmenting the copolymer solution with calcium carbonate applied coatings on conductive paper hold a charge better than if the acrylamide component were omitted. Also, good electrographic properties are maintained at pigment to binder ratios as high as about 4:1.

EXAMPLE 2

Repeating Example 1, but using a 55% solvent solution having a viscosity of about $Z_5$ (55% toluene and 45% isopropanol) gives about the same results as in Example 1.

EXAMPLE 3

Repeating Example 1, but increasing the acrylamide content of the copolymer from 10% to 30% allows the pigment to binder ratio to be usefully increased to about 6:1.

What is claimed is:

1. Electrically conductive paper coated with an insulating coating comprising a solvent-soluble copolymer of monoethylenically unsaturated monomers comprising from 5% to 40% of copolymerized acrylamide or a monoethylenic derivative thereof.

2. Conductive paper as recited in claim 1 in which said copolymer comprises from 5% to 40% of copolymerized acrylamide.

3. Conductive paper as recited in claim 1 in which said insulating coating is pigmented.

4. Conductive paper as recited in claim 3 in which said pigment is calcium carbonate.

5. Conductive paper as recited in each of claims 3 and 4 in which said pigment is present in a pigment to binder ratio of from 2:1 to 6:1.

6. Conductive paper as recited in claim 5 in which said copolymer comprises from 7% to 30% of copolymerized acrylamide.

7. Conductive paper as recited in claim 6 in which the copolymer further comprises copolymerized $C_1$–$C_8$ alkanol esters of acrylic and methacrylic acids.

8. Conductive paper as recited in claim 7 in which said copolymer contains at least about 30% of copolymerized methyl methacrylate.

9. Conductive paper as recited in claim 7 in which said copolymer also contains from 3–20% of copolymerized hydroxy functional monoethylenic monomer.

10. Conductive paper as recited in claim 9 in which said hydroxy functional monomer is 2-hydroxyethyl methacrylate.

11. Conductive paper as recited in claim 1 in which said copolymer is formed by solution copolymerization of said monoethylenically unsaturated monomers.

* * * * *